(12) United States Patent
Yamamoto (10) Patent No.: US 10,705,419 B2
(45) Date of Patent: Jul. 7, 2020

(54) PRISM DEVICE FOR USE IN TWO-PLATE VIDEO PROJECTOR APPARATUS CAPABLE OF REDUCING INTERNAL STRAY LIGHT OF PRISM DEVICE

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/419,592

(22) Filed: May 22, 2019

(65) Prior Publication Data

US 2019/0361333 A1   Nov. 28, 2019

(30) Foreign Application Priority Data

May 28, 2018  (JP) ................................ 2018-101613

(51) Int. Cl.
*H04N 9/31*   (2006.01)
*G02B 26/08*  (2006.01)
*G02B 27/14*  (2006.01)
*G03B 33/12*  (2006.01)
*G03B 21/00*  (2006.01)
*G03B 21/20*  (2006.01)

(52) U.S. Cl.
CPC ........... *G03B 33/12* (2013.01); *G03B 21/008* (2013.01); *G03B 21/204* (2013.01)

(58) Field of Classification Search
CPC .... G03B 21/00–64; G03B 33/12; G02B 5/04; G02B 27/01–0189; G02B 27/126; G02B 27/141; G02B 27/145; G02B 27/1026; G02B 26/008; H04N 9/31–3197
See application file for complete search history.

(56) References Cited

U.S. PATENT DOCUMENTS

2006/0132718 A1*  6/2006  Lerner ............... G02B 27/1026
                                                         353/33
2016/0277717 A1*  9/2016  Terada ................. H04N 9/3105

FOREIGN PATENT DOCUMENTS

JP   2009-150974   7/2009
JP   2010-113285   5/2010
JP   2012-63564    3/2012

* cited by examiner

*Primary Examiner* — Cara E Rakowski
*Assistant Examiner* — Christopher A Lamb, II
(74) *Attorney, Agent, or Firm* — Wenderoth, Lind & Ponack, L.L.P.

(57) ABSTRACT

A first prism has first to third faces. The first face is opposing a first optical modulator. Any two planes among three planes respectively including the first to third faces intersect with each other. A second prism has fourth to sixth faces. The fourth face is provided to be in contact with the third face via a dichroic coating layer and in parallel with the third face. The fifth face is opposing a second optical modulator and in parallel with the second face. The sixth face is in opposite to the first optical modulator with respect to an optical axis of the second optical modulator. The sixth face is formed to be inclined with respect to a reference surface, such that an unnecessary transmitted light and an unnecessary reflected light of the dichroic coating layer are not totally reflected by the sixth face.

5 Claims, 8 Drawing Sheets

PRISM DEVICE FOR USE IN TWO-PLATE VIDEO PROJECTOR APPARATUS CAPABLE OF REDUCING INTERNAL STRAY LIGHT OF PRISM DEVICE

BACKGROUND

1. Technical Field

The present disclosure relates to a prism device for separating and combining different color components of an incident light, and relates to a video projector apparatus provided with such a prism device.

2. Description of Related Art

Among conventional video projector apparatuses, for example, there is a three-plate apparatus provided with three optical modulator elements. In such a three-plate video projector apparatus, a light source produces an illuminating light, a prism device separates three primary color components R. G, and B of the illuminating light from each other, the separated color components are incident to the optical modulator elements, respectively, the prism device re-combines reflected lights from the optical modulator elements, and the combined light is projected on a screen. In order to separate and combine the three color components from/with each other, a prism device having a dichroic coating layer is used.

In addition, among conventional video projector apparatuses, a single-plate apparatus provided with only one optical modulator element has been developed, for the purpose of simplification and size reduction the apparatus. The single-plate video projector apparatus produces three primary color components R, G, and B incident to the optical modulator element in a time-division manner, i.e., rapidly changes the color to practically display a full color video.

Since a single-plate video projector apparatus displays a full color video using a single optical modulator element, there is a limit to an increase in brightness due to restriction on the temperature of the optical modulator element. Therefore, in recent years, a so-called two-plate apparatus has been developed for the purpose of simplification and increased brightness of the apparatus, the two-plate apparatus being provided with two optical modulator elements, two color components being incident to the same optical modulator element, and another color component being separated and combined by a prism device. Since an amount of light incident to each optical modulator element is reduced by using two plates, it is possible to increase brightness within a range of restriction on the temperature of the optical modulator element.

For example, the inventions of Japanese Patent laid-open Publications No. 2010-113285 and No. 2009-150974 have been proposed as two-plate video projector apparatuses.

Japanese Patent laid-open Publication No. 2010-113285 discloses a projector apparatus for improving efficiency in light utilization, in which the projector apparatus adjusts polarization of a light from a light source so as to be S-polarization, and changes polarizations of R and G component lights to P-polarization in a time-division manner using a polarization converter wheel disposed subsequent to a rod integrator, and thus, only S-polarized light is incident to a dichroic film of a prism.

Japanese Patent laid-open Publication No. 2009-150974 discloses a projector apparatus for improving efficiency in light utilization, in which a polarization converter wheel is disposed in front of a rod integrator, an illuminating light and a modulated light are made incident to different regions on a dichroic film of a prism, respectively, and coating characteristics of these regions are individually set so as to achieve separation characteristics of S-polarized light suitable for an incident angle of the illuminating light and an incident angle of the modulated light.

A reflected light from an optical modulator element is reflected in a direction different from that of incident light to the optical modulator element. Therefore, an incident angle of an illuminating light to a dichroic coating layer is different from an incident angle of a modulated light to the dichroic coating layer, the illuminating light traveling from a light source to the optical modulator element, and the modulated light reflected by the optical modulator element and traveling from the optical modulator element to a screen via a projective optical system. Hence, when combining color components with each other, a reflection wavelength and a transmission wavelength of the dichroic coating layer differ from each other (wavelength shift), and a part of the modulated light produces unintended reflection or transmission, and thus, a stray light occurs inside a prism device.

There is a problem that the stray light inside the prism device reduces video contrast, and degrades quality of a projected video. In addition, there is a problem that the stray light hinders from increasing brightness, since a part of the produced stray light is reflected inside the prism device and strikes a surface of another optical modulator element to raise a temperature of the optical modulator element.

According to the technique of Japanese Patent laid-open Publication No. 2010-113285, it is possible to improve efficiency in light utilization of separating and combining the color components from/with each other, by making only the S-polarized light incident to the dichroic film of the prism. However, it is not possible to avoid the wavelength shift occurring when combining the color components with each other, due to the difference between the incident angles of the illuminating light and the modulated light to the dichroic film. As a result, according to the technique of Japanese Patent laid-open Publication No. 2010-113285, there is a problem that the stray light occurs inside the prism.

In addition, according to the technique of Japanese Patent laid-open Publication No. 2009-150974, it is possible to improve efficiency in light utilization of separating and combining the color components from/with each other, by individually setting the characteristics of the regions on the dichroic film of the prism, the illuminating light and the modulated light being made incident to the regions, respectively. To this end, as a first condition, it is necessary to use a large prism to provide these regions on the dichroic film. It requires a long back focus of the projective optical system, and as a result, the size of the projective optical system increases. In addition, as a second condition for achieving the technique of Japanese Patent laid-open Publication No. 2009-150974, it is necessary to increase an F value of each of light beams of the illuminating light and the modulated light, i.e., to make a bundle of rays thin. As a result, according to the technique of Japanese Patent laid-open Publication No. 2009-150974, there is a problem that the brightness significantly decreases.

One non-limiting and exemplary embodiment is to provide a prism device for use in a two-plate video projector apparatus, the prism device being capable of reducing an internal stray light due to a difference between incident angles of an illuminating light and a modulated light to a dichroic coating layer, without increasing the number of optical components nor complicating a control mechanism.

In addition, one non-limiting and exemplary embodiment is to provide a video projector apparatus provided with such a prism device.

SUMMARY

According to an aspect of the present disclosure, a prism device for use in a video projector apparatus provided with first and second optical modulator elements is provided. The prism device is provided with first and second prism elements. The first prism element has first to third side faces in parallel with a reference axis. The first side face is opposing the first optical modulator element. Any two planes among three planes respectively including the first to third side faces intersect with each other. The second prism element has fourth to sixth side faces in parallel with the reference axis. The fourth side face is provided to be in contact with the third side face via a dichroic coating layer and in parallel with the third side face. The fifth side face is opposing the second optical modulator element and in parallel with the second side face. The sixth side face is provided on an opposite side of the first optical modulator element with respect to an optical axis of the second optical modulator element. The sixth side face is formed to be inclined at an angle larger than 0 degrees and smaller than 90 degrees with respect to a reference surface passing through an intersection line of a plane including the second side face and a plane including the third side face, the reference surface being perpendicular to the plane including the second side face, such that a light beam incident from the first optical modulator element to the first prism element via the first side face, then reflected by the second side face, and then incident from the first prism element to the second prism element via the third and fourth side faces is not totally reflected by the sixth side face.

The present disclosure can provide a prism device for use in a two-plate video projector apparatus, the prism device being capable of reducing an internal stray light due to a difference between incident angles of an illuminating light and a modulated light to a dichroic coating layer, without increasing the number of optical components nor complicating a control mechanism.

Further, the present disclosure can provide a prism device with reduced temperature rise of an optical modulator element, otherwise the temperature rise may occur when a stray light inside a prism strikes on another optical modulator element.

DETAILED DESCRIPTION

Hereinafter, an embodiment will be described in detail with reference to the drawings as appropriate. However, excessively detailed explanation may be omitted. For example, detailed explanation of well-known matters may be omitted, and redundant explanations on substantially the same configuration may be omitted. This is to avoid the unnecessary redundancy of the following description, and to facilitate understanding by those skilled in the art.

It is to be noted that the inventor(s) intends to provide the accompanying drawings and the following description so that those skilled in the art can sufficiently understand the present disclosure, and does/do not intend to limit subject matters recited in the claims.

Embodiment

Hereinafter, an embodiment will be described with reference to FIGS. 1 to 8. Hereinafter, as a specific embodiment of a video projector apparatus according to the present disclosure, a video projector apparatus provided with a digital micromirror device (hereinafter referred to as "DMD") for optical modulation control is described.

1-1. Overall Configuration

Figure 1:
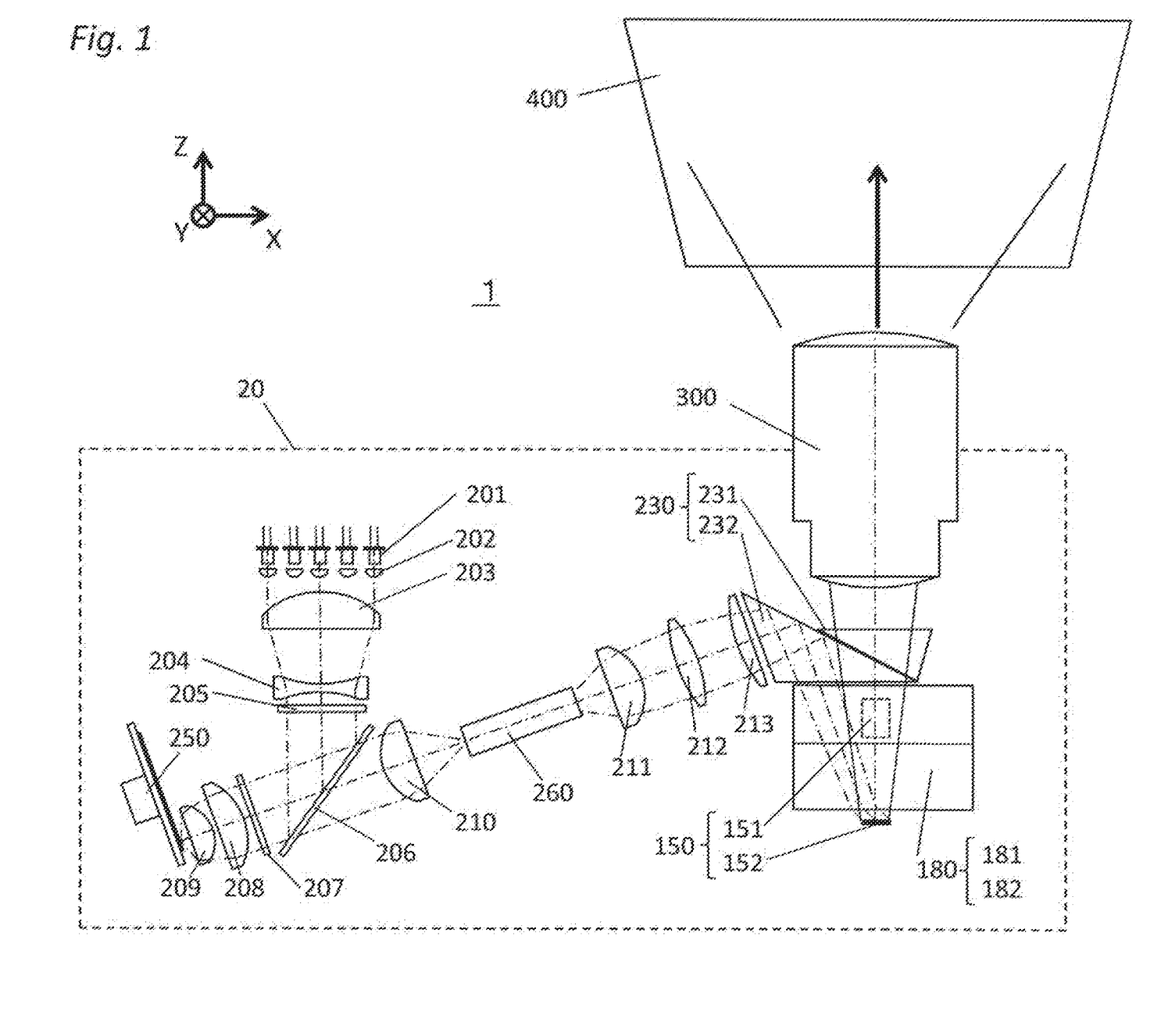
FIG. 1 is a schematic view showing a configuration of a video projector apparatus according to an embodiment.
Figure 2:
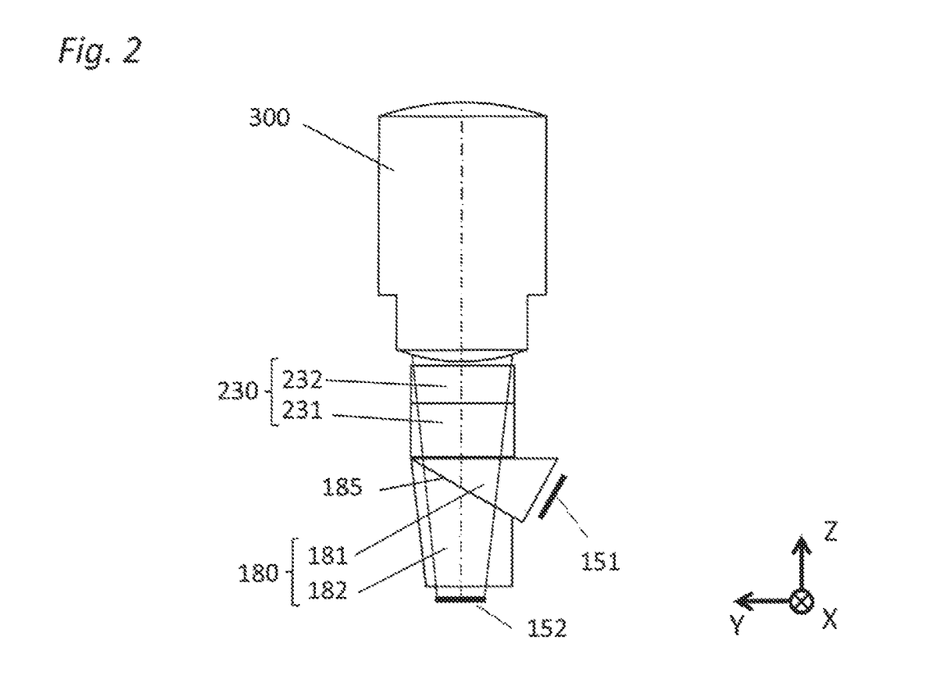
FIG. 2 is a side view of a prism device 180, a TIR prism 230, and a projective optical system 300 of FIG. 1.

FIG. 1 is a schematic view showing a configuration of a video projector apparatus according to an embodiment. FIG. 2 is a side view of a prism device 180, a TIR prism 230, and a projective optical system 300 (described later) of FIG. 1.

Referring to FIG. 1, a video projector apparatus 1 is provided with: a plurality of blue semiconductor lasers (hereinafter referred to as "LDs") 201, a plurality of lenses 202, 203, and 204, a diffusion plate 205, and a dichroic mirror 206. The video projector apparatus 1 is further provided with: a quarter wave plate 207, condenser lenses 208 and 209, and a phosphor wheel 250. The video projector apparatus 1 is further provide with: a condenser lens 210, a rod integrator 260, lenses 211, 212, and 213, a total internal reflection prism (hereinafter referred to as "TIR prism") 230, the prism device 180, a DMD 150, and a projective optical system 300. These components of the video projector apparatus 1 are provided inside a cabinet 20.

The LDs 201 emit blue component lights having a wavelength width of 447 nm to 462 nm, and linearly polarized. The LDs 201 are arranged such that exiting lights are S-polarized with respect to an incident surface of the dichroic mirror 206. The lenses 202 are collimating lenses that collimate exiting lights from the LDs 201.

The lenses 203 and 204 constitute an afocal system that converges a parallel light to produce another parallel light. Specifically, the lens 203 is a condenser lens that collects parallel lights from the plurality of lenses 202, and the lens 204 is a concave lens that collimates light from the lens 203. The diffusion plate 205 diffuses a light from the lens 204, and the light having passed through the diffusion plate 205 is incident to the dichroic mirror 206.

Figure 3:
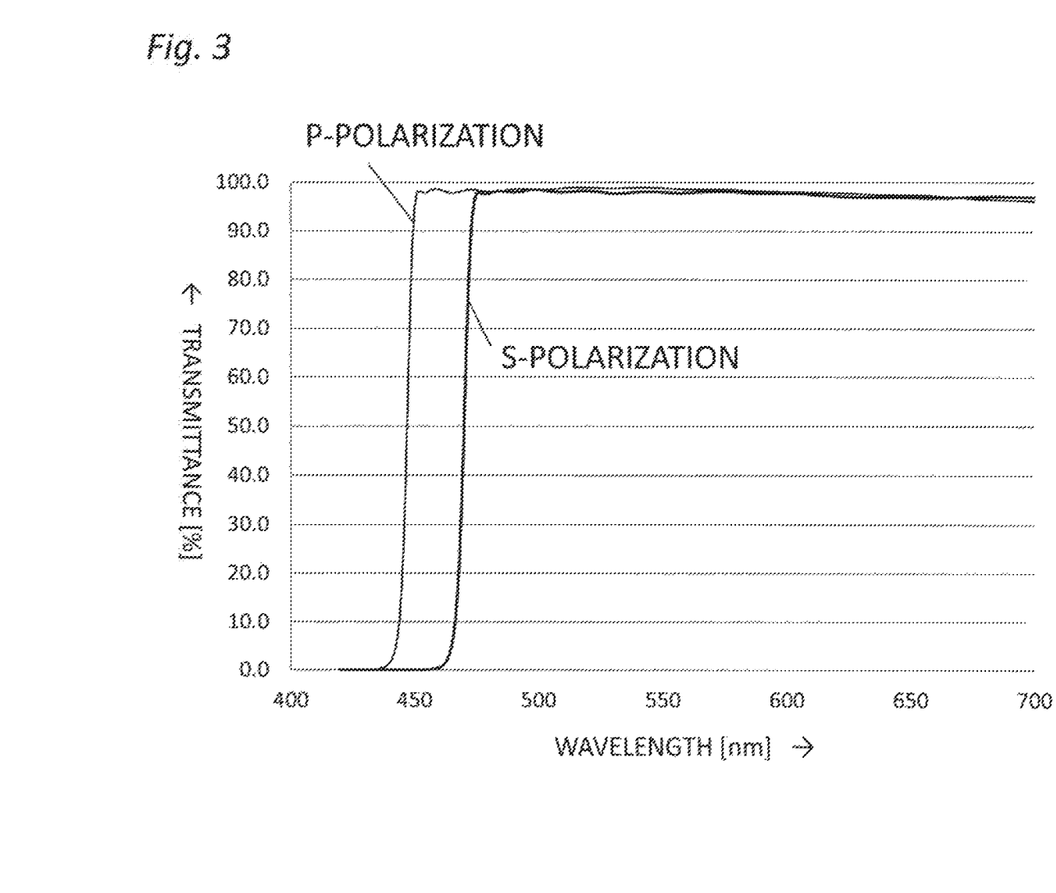
FIG. 3 is a graph showing spectral transmittance characteristics of a dichroic mirror 206 of FIG. 1.

FIG. 3 is a graph showing spectral transmittance characteristics of the dichroic mirror 206 of FIG. 1. When an S-polarized light having a wavelength of 465 nm (blue light) is incident to the dichroic mirror 206, and when a P-polarized light having a wavelength of 442 nm (blue light) is incident to the dichroic mirror 206, the dichroic mirror 206 transmits the incident light with a transmittance of 50%, and reflects the rest. As the wavelength becomes longer, the transmittance also becomes higher, and the dichroic mirror 206 transmits a green component and a red component of the incident light with a transmittance of 96% or more, irrespective of S-polarization or P-polarization. An S-polarized component of the incident light to the dichroic mirror 206 is reflected, and travels in a direction of the quarter wave plate 207.

The blue light reflected by the dichroic mirror 206 is incident to the quarter wave plate 207. The quarter wave plate 207 is a retardation plate having a retardation of a quarter wavelength near a central wavelength of an emitted light of a semiconductor laser. The light having passed through the quarter wave plate 207 is circularly polarized, and the light is incident to the condenser lenses 208 and 209, and converged on a surface of the phosphor wheel 250. A focal distance of the condenser lens 209 is set such that an angle of convergence is 40 degrees or less, forming a focused spot near the phosphor wheel 250.

Figure 4A:
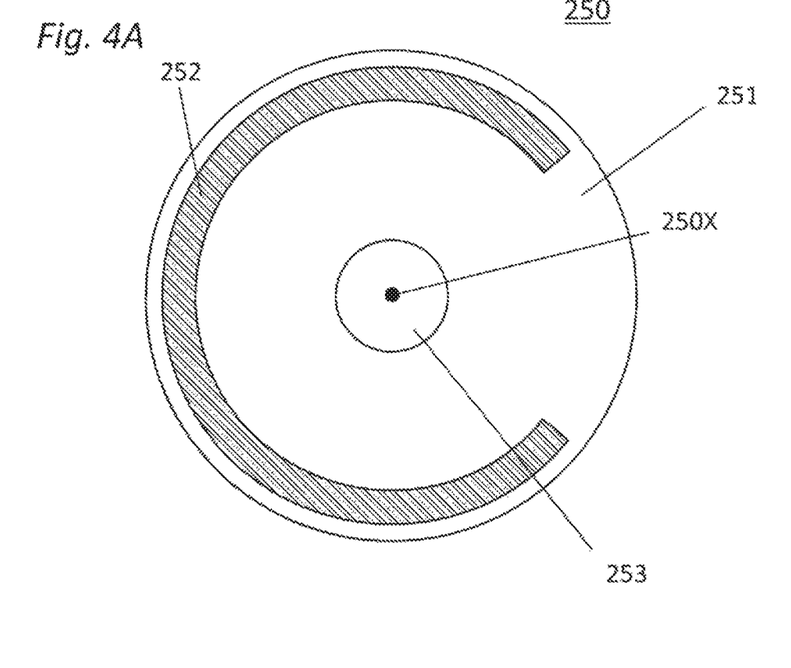
FIG. 4A is a front view showing an exemplary configuration of a phosphor wheel 250 of FIG. 1.
Figure 4B:
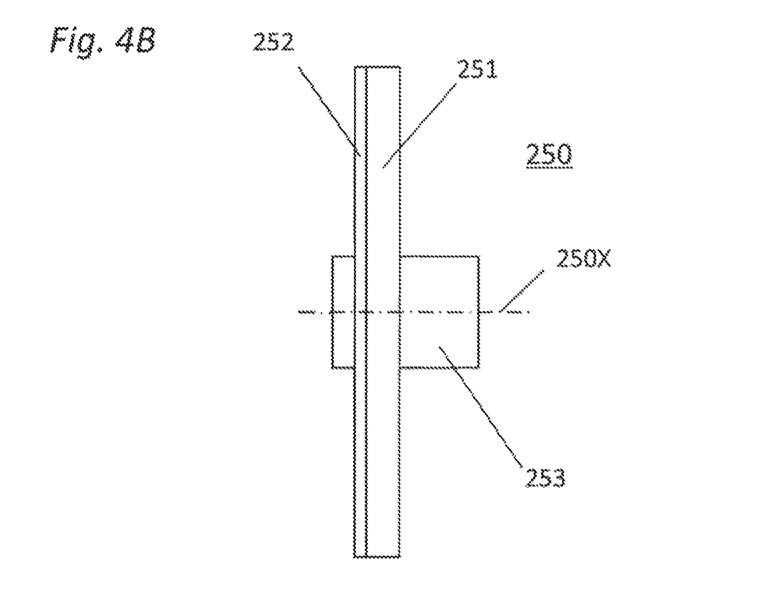
FIG. 4B is a side view showing an exemplary configuration of the phosphor wheel 250 of FIG. 1.

FIGS. 4A and 4B are schematic views showing an exemplary configuration of the phosphor wheel 250 of FIG. 1. FIG. 4A is a front view of a surface of the phosphor wheel 250 to which the light is incident, and FIG. 4B is a side view of the phosphor wheel 250 of FIG. 4A. The phosphor wheel 250 is provided with an aluminum substrate 251, and a driving motor 253 coupled to the center of the aluminum substrate 251. The aluminum substrate 251 is a circular substrate that is rotatable around a center axis 250X. A reflection film (not shown) is formed on a surface of the aluminum substrate 251, and a phosphor layer 252 is formed on a surface of the reflection film. The reflection film is a metal layer or a dielectric film that reflects visible light. The phosphor layer 252 is formed of Cerium-doped YAG (yttrium aluminium garnet) yellow phosphor material, that produces a yellow light containing green and red wavelength components when excited by a blue light. A typical chemical composition of a crystal matrix of this phosphor material is: $Y_3Al_5O_{12}$. The phosphor layer 252 is substantially annularly shaped, however, a part of the annular phosphor layer 252 is formed without phosphor material, but only with the reflection film, in order to reflect the blue light.

The phosphor layer 252 excited by a spot light produces a yellow light including the green and red components. Since the phosphor wheel 250 is made of the aluminum substrate 251 and rotated with respect to the center axis 250X, it is possible to reduce a temperature rise of the phosphor layer 252 due to the blue excitation light, and stably maintain efficiency in phosphorescent conversion. A light incident to the phosphor layer 252 produces a phosphorescent light including the green and red components, and the phosphorescent light exits from the phosphor wheel 250. In addition, a light emitted toward the reflection film is reflected by the reflection film, and the reflected light exits from the phosphor wheel 250. The light including the green and red components exits from the phosphor layer 252 as natural light with random polarization. The light exited from the phosphor layer 252 is converged again by the condenser lenses 209 and 208 to be a substantially parallel light incident to the quarter wave plate 207. Since the light including the green and red components passes through the quarter wave plate as natural light, its polarization does not change. Then, the light is transmitted through the dichroic mirror 206. The light having been transmitted through the dichroic mirror 206 is incident to the condenser lens 210 to converge on the rod integrator 260.

On the other hand, as mentioned above, a part of the annular phosphor layer 252 is formed without phosphor material, but only with the reflection film. At this part, the phosphor wheel 250 reflects the spot light as it is, and the blue component light exits from the phosphor wheel 250. The blue component light exiting from the phosphor wheel 250 is circularly polarized with reverse handedness to that of the blue component light incident to the phosphor wheel 250, a phase of the incident light being inverted when reflected by the reflection film, The light reflected by the reflection film is converged again by the condenser lenses 209 and 208 to be a substantially parallel light incident to the quarter wave plate 207. The circularly-polarized light incident to the quarter wave plate 207 with reverse handedness is converted into a P-polarized light, and then transmitted through the dichroic mirror 206. The light having been transmitted through the dichroic mirror 206 is incident to the condenser lens 210 to converge on the rod integrator 260.

Thus, the yellow light (including the green and red components) and the blue component light, that have exited from the phosphor wheel 250, are incident to the rod integrator 260 in a time-division manner. These red, green, and blue component lights exhibit good three primary colors. It is possible to provide light emission characteristics of good white balance by combining these color component lights in a time-division manner. Further, the light including these color components can be converted into a color of desired chromaticity coordinates by controlling ON/OFF of micromirrors of the DMD 150.

The rod integrator 260 is a solid rod made of a transparent member, such as glass. The rod integrator 260 produces a light having a uniform light intensity distribution by internally reflecting an incident light a plurality of times. The rod integrator 260 may be a hollow rod with an inner wall made of mirror surfaces.

The lenses 211, 212, and 213 are relay lenses that substantially form an image of an exiting light from the rod integrator 260, on the DMD 150. A light having exited from the rod integrator 260 passes through the lenses 211, 212, and 213, and is incident to the total internal reflection prism (hereinafter referred to as "TIR prism") 230. The TIR prism 230 is made of two prisms 231 and 232, and a thin air layer (not shown) is formed between on opposing surfaces of these prisms 231 and 232. The air layer totally reflects light incident at an angle equal to or more than a critical angle. A light incident from the lens 213 to the TIR prism 232 is totally reflected by this air layer, and is incident to the prism device 180 for separating and combining the color components.

The prism device 180 is made of two prism elements 181 and 182, and a dichroic coating layer 185 is formed between opposing surfaces of these prism elements 181 and 182. The prism element 181 is, for example, a triangular prism, and the prism element 182 is, for example, a quadrangular prism. A light incident from the TIR prism 232 passes through the prism element 181, and then reaches the dichroic coating layer 185.

In this specification, the prism elements 181 and 182 are also referred to as "first prism element" and "second prism element", respectively.

Figure 5:
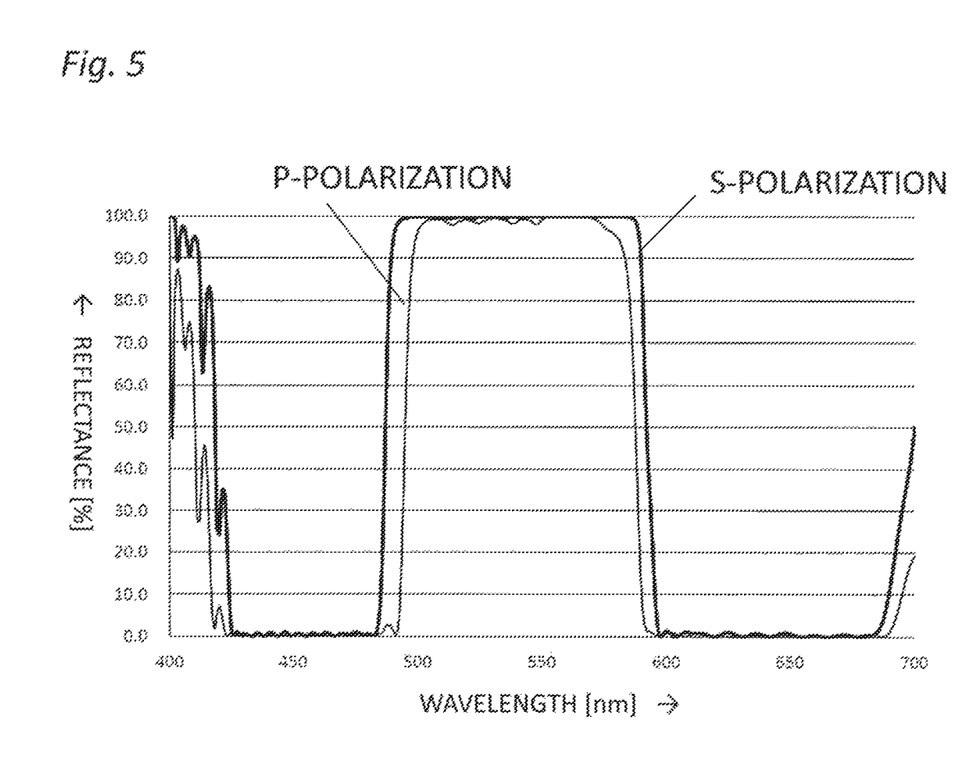
FIG. 5 is a graph showing spectral reflectance characteristics of a dichroic coating layer 185 of FIG. 1.

FIG. 5 is a graph showing spectral reflectance characteristics of the dichroic coating layer 185 of FIG. 1. The dichroic coating layer 185 is configured to reflect a light having a wavelength range corresponding to green, and transmit a light having other wavelengths (blue light, red light). We assume that a light is incident to a surface of the dichroic coating layer 185 at an incident angle of 28 degrees. When an S-polarized light having a wavelength of 487 nm or a wavelength of 592 nm (green light) is incident to the dichroic coating layer 185, and when a P-polarized light having a wavelength of 492 nm or a wavelength of 588 nm (green light) is incident to the dichroic coating layer 185, the dichroic coating layer 185 transmits the incident light with a transmittance of 50%, and reflects the rest.

The yellow light having exited from the phosphor layer 252 of FIG. 4 and including the green and red component lights is incident to the dichroic coating layer 185 of the prism device 180. The green component light is reflected by the dichroic coating layer 185, and then totally reflected by a surface of the prism element 181, and then substantially forms an image on the DMD 151. On the other hand, the red component light is transmitted through the dichroic coating layer 185, and is then incident to the prism element 182. The light having been transmitted through the dichroic coating layer 185 passes through the prism element 182, and then substantially forms an image on the DMD 152.

In addition, the blue component light having exited from the phosphor wheel 250 is incident to and transmitted through the dichroic coating layer 185 of the prism device 180, and then passes through the prism element 182, and then substantially forms an image on the DMD 152.

The DMDs 151 and 152 modulate incident lights based on various control signals, such as video signals, to produce video lights having different light intensities in a time-division manner, respectively. Specifically, each of the DMDs 151 and 152 has a plurality of movable micromirrors. Basically, each micromirror corresponds to one pixel. The DMDs 151 and 152 change angles of the micromirrors based on various control signals to change whether or not to direct reflected lights to the projective optical system 300.

In this specification, the DMDs 151 and 152 are also referred to as "first optical modulator element" and "second optical modulator element", respectively.

The lights reflected by the DMDs 151 and 152 are incident to the prism elements 181 and 182, respectively, and then re-incident to the dichroic coating layer 185. Since an incident angle of the light re-incident to the dichroic coating layer 185 is different from an incident angle of the light incident from the rod integrator 260, a wavelength shift occurs between the reflection and transmission characteristics of the dichroic coating layer 185.

The green component light is re-incident from the DMD 151 to the prism element 181, and then re-incident to the dichroic coating layer 185. The dichroic coating layer 185 reflects most of the green component light, and the reflected light passes through the prism element 181, the TIR prisms 232 and 231, and the projective optical system 300, and then exits from the projective optical system 300 to a projection surface 400. However, due to the wavelength shift, a part of the green component light is not reflected by the dichroic coating layer 185, but incident from the prism element 181 to the prism element 182.

Similarly, the red and blue component lights are re-incident from the DMD 152 to the prism element 182, and then re-incident to the dichroic coating layer 185. The dichroic coating layer 185 transmits most of the red and blue component lights, and the transmitted lights pass through the prism element 181, the TIR prisms 232 and 231, and the projective optical system 300, and then exits from the projective optical system 300 to the projection surface 400. However, due to the wavelength shift, a part of the blue and red component lights is not transmitted through, but reflected by the dichroic coating layer 185, and re-incident to the prism element 182.

Thus, the yellow component light and the blue component light, that has exited from the phosphor wheel 250, exit from the projective optical system 300 as the blue component light and as the green and red component lights, respectively, in a time-division manner. When these color component lights reach the projection surface 400, these color component lights are combined in a time-division manner to be recognized as a full color video. At this time, if a cycle for time division is long, color flicker may be seen by human eyes. Accordingly, in a case of displaying 60 frames/second (60 fps) video data, it is possible to reduce color flicker by, for example, driving the DMDs 151 and 152 at a triple (180 fps) of the frame rate of the video data for each cycle from yellow (i.e., red and green) to blue.

1-2. Configuration of Prism Device

Figure 6:
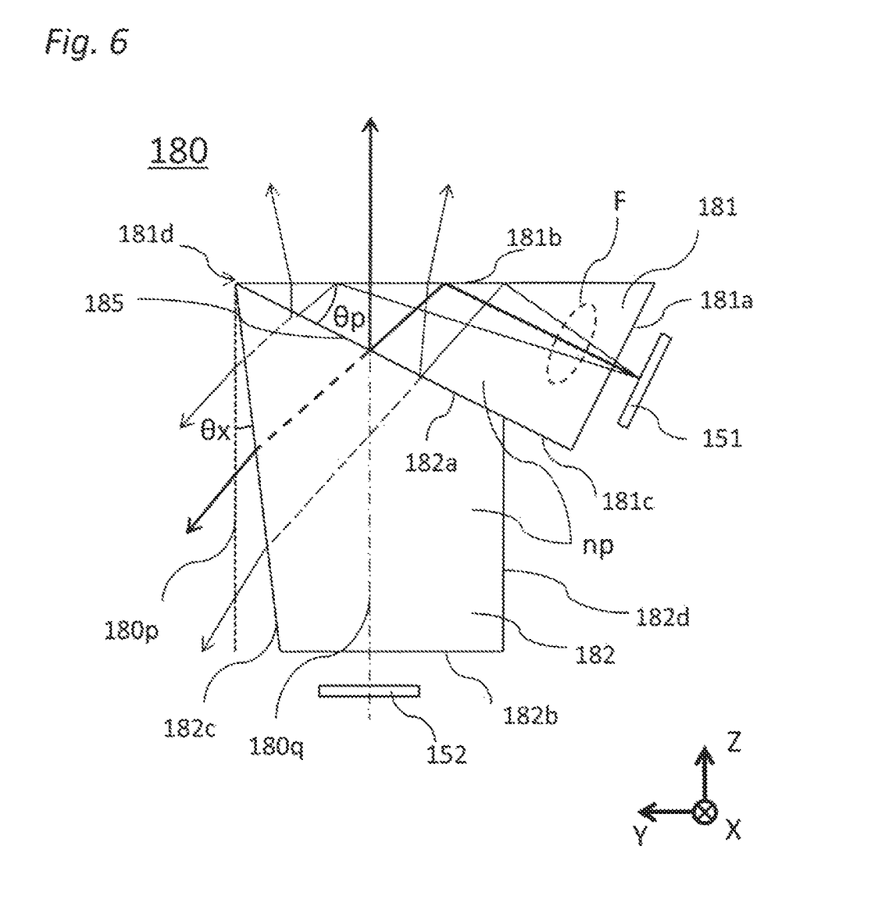
FIG. 6 is a schematic view showing a path of a modulated light incident from a DMD 151 of FIG. 1 to the prism device 180.

FIG. 6 is a schematic view showing a path of a modulated light incident from the DMD 151 of FIG. 1 to the prism device 180. FIG. 6 also shows a detailed configuration of the prism device 180 according to the embodiment.

Referring to FIG. 6, the prism device 180 includes the prism elements 181 and 182, as described above.

The prism element 181 has first to third side faces 181a to 181c in parallel with an X axis (also referred to as "reference axis"). The side face 181a is opposing the optical modulator element 151. Any two planes among three planes respectively including the side faces 181a to 181c intersect with each other. In particular, a plane including the side face 181b intersects with a plane including the side face 181c, at an intersection line 181d, i.e., a straight line in parallel with the X axis. The prism element 181 is, for example, a triangular prism.

The prism element 182 has fourth to sixth side faces 182a to 182c in parallel with the X axis. The side face 182a is provided to be in contact with the side face 181c via the dichroic coating layer 185 and in parallel with the side face 181c. The side face 182b is opposing the optical modulator element 152 and in parallel with the side face 181b. In the example of FIG. 6, the side faces 181b and 182b are provided in parallel with an XY plane. The side face 182c is provided on an opposite side of the optical modulator element 151 with respect to an optical axis 180q of the optical modulator element 152. The prism element 182 may further have, for example, a side face 182d in parallel with the X axis, and may be a quadrangular prism.

FIG. 6 also shows a path of the modulated light of the green component light, which is reflected by the DMD) 151. The modulated light, which is modulated and reflected by the DMD 151, is incident to the side face 181a as a bundle of rays having a desired F value. The incident light beam travels inside the prism element 181, and reaches the side face 181b. The side face 181b is configured to totally internally reflect the modulated light. Therefore, at this point of time, the light beam does not pass through the side face 181b, but is totally reflected, and travels toward the side face 181c. Most of the modulated light having reached the side face 181c is reflected by the dichroic coating layer 185, and then travels toward the side face 181b, and then passes through the side face 181b to exit from the prism element 181.

A part of the modulated light incident from inside the prism element 181 to the dichroic coating layer 185 is not reflected by, but transmitted through the dichroic coating layer 185 due to the wavelength shift, and then, incident to the side face 182a, travels inside the prism element 182, and reaches the side face 182c. Hereinafter, this light beam is referred to as an unnecessary transmitted light of the dichroic coating layer 185. When the unnecessary transmitted light of the dichroic coating layer 185 is reflected by the side face 182c, a stray light occurs inside the prism device 180. Therefore, according to the prism device of the embodiment, the side face 182c is formed to be inclined at an angle θx larger than 0 degrees and smaller than 90 degrees with respect to a reference surface 180p (a plane in parallel with an XZ plane), the reference surface 180p passing through the intersection line 181d and perpendicular to the plane including the side face 181b. such that the unnecessary transmitted light of the dichroic coating layer 185 is not totally reflected by the side face 182c.

The angle θx according to the embodiment satisfies the following mathematical expression (1):

$$\theta x > 90 - 2\cdot\theta p + \sin^{-1}\left(\frac{1}{2\cdot np \cdot F}\right) - \sin^{-1}\left(\frac{1}{np}\right), \quad (1)$$

where "F" denotes an F value of a modulated light incident from the optical modulator element 151 to the prism element 181, "np" denotes a refractive index of glass material of the prism elements 181 and 182, and "θp" denotes an angle between the side face 181b and the side face 181c.

By forming the side face 181c so as to satisfy the mathematical expression (1), the unnecessary transmitted light of the dichroic coating layer 185 can exit from the side face 182c, without being totally reflected by the side face 182c. The side face 182c is transparent so as to transmit a light beam. Thus, it is possible to reduce the stray light inside the prism device 180, and as a result, video contrast is not likely to degrade.

In the embodiment, for example, when an F value of the modulated light incident from the DMD 151 to the prism element 181 is 2.2, a refractive index "np" is 1.5168, and an angle "θp" is 28 degrees, the angle "θx" can be set to 1.4 degrees.

Figure 7:
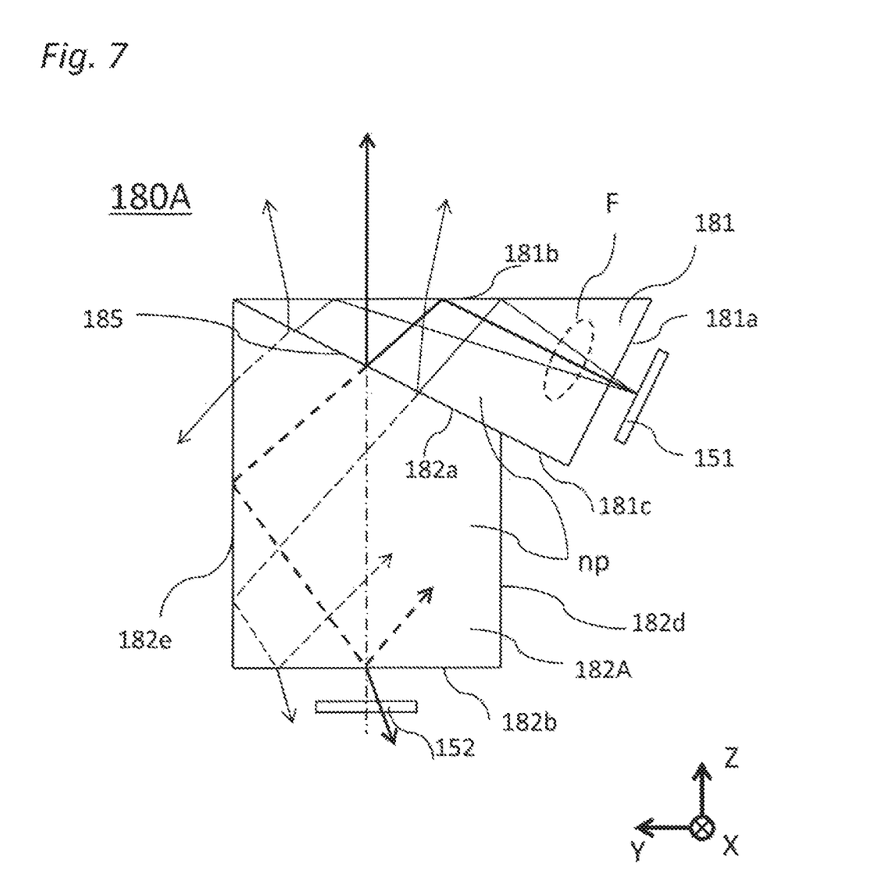
FIG. 7 is a schematic view showing a path of a modulated light incident to a prism device according to a comparison example.

FIG. 7 is a schematic view showing a path of a modulated light incident to a prism device according to a comparison example. A prism device 180A of FIG. 7 is provided with a prism element 182A having a side face 182e perpendicular to the side face 181b, instead of the prism element 182 of FIG. 6. In this case, since the unnecessary transmitted light of the dichroic coating layer 185 is incident to the side face 182e at a large incident angle, a part of the unnecessary transmitted light of the dichroic coating layer 185 is totally internally reflected by the side face 182e, and the light beam reflected by the side face 182e travels to the side face 182b. This light beam is again reflected by the side face 182b to become a stray light in the prism, which may consequently reduce contrast. In addition, the light beam having passed through the side face 182b and reached the DMD 152 increases a surface temperature of the DMD 152, which may hinder from increasing brightness due to restriction on the temperature of the DMD.

Figure 8:
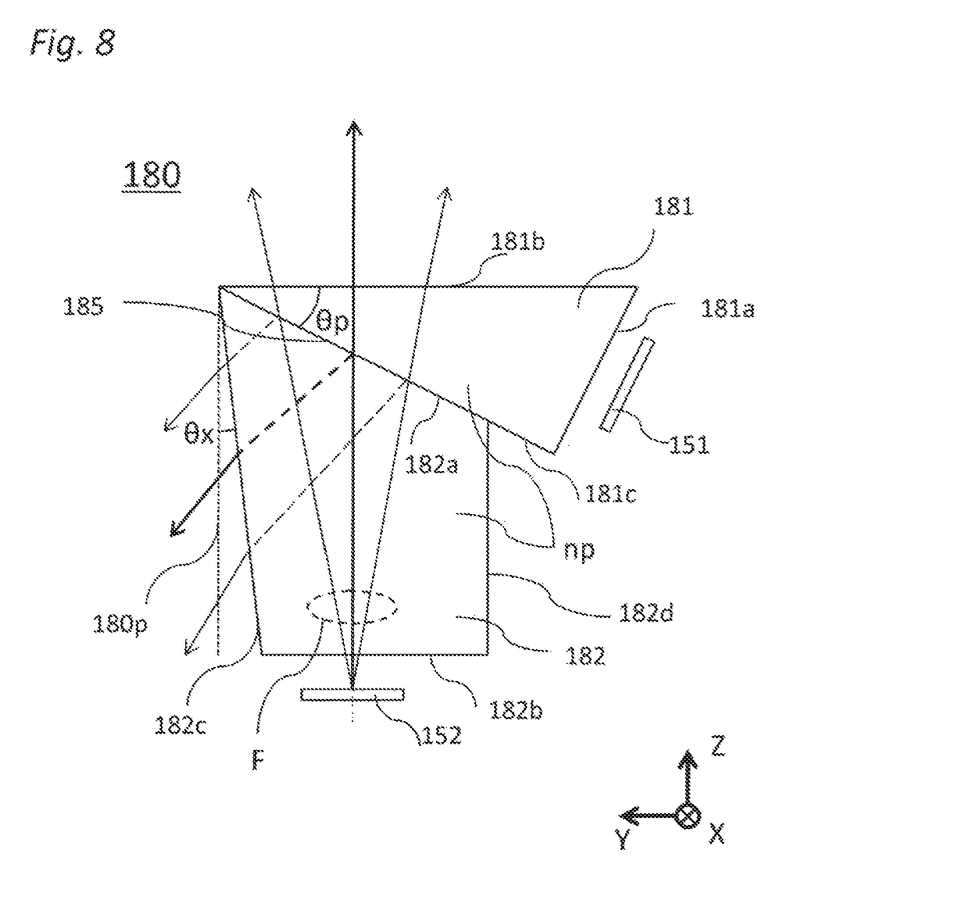
FIG. 8 is a schematic view showing a path of a modulated light incident from a DMD 152 of FIG. 1 to the prism device 180.

FIG. 8 is a schematic view showing a path of a modulated light incident from the DMD 152 of FIG. 1 to the prism device 180. FIG. 8 shows a path of the red and blue component lights reflected by the DMD 152 of the same prism device 180 as that of FIG. 6. The modulated light, which is modulated and reflected by the DMD 152, is incident to the side face 182b as a bundle of rays having a desired F value. The incident light beam travels inside the prism element 182, and reaches the side face 182a. Most of the modulated light reached the side face 182a is transmitted through the dichroic coating layer 185, and then travels toward the side face 181b, and then passes through the side face 181b to exit from the prism element 181.

A part of the modulated light incident from the inside of the prism element 182 to the dichroic coating layer 185 is not transmitted through, but reflected by the dichroic coating layer 185 due to the wavelength shift, and then, reaches the side face 182c. Hereinafter, this light beam is referred to as an unnecessary reflected light of the dichroic coating layer 185. When the unnecessary reflected light of the dichroic coating layer 185 is reflected by the side face 182c, a stray light occurs inside the prism device 180. However, as described above, according to the prism device of the embodiment, since the side face 182c is formed to be inclined at the angle θx with respect to the reference surface 180p, the unnecessary reflected light of the dichroic coating layer 185 is not totally reflected by the side face 182c, but is at least partially transmitted through the side face 182c.

By forming the side face 181c so as to satisfy the mathematical expression (1), the unnecessary reflected light of the dichroic coating layer 185 can also exit from the side face 182c, without being totally reflected by the side face 182c. Thus, it is possible to reduce the stray light inside the prism device 180, and as a result, video contrast is not likely to degrade.

1-3. Advantageous Effects and Others

As described above, according to the embodiment, there is provided the prism device 180 for use in the video projector apparatus 1 provided with the optical modulator elements 151 and 152. The prism device 180 includes the prism elements 181 and 182. The prism element 181 has the first to third side faces 181a to 181c in parallel with the reference axis. The first side face 181a is opposing the optical modulator element 151. Any two planes among three planes respectively including the first to third side faces 181a to 181c intersect with each other. The prism element 182 has the fourth to sixth side faces 182a to 182c in parallel with the reference axis. The fourth side face 182a is provided to be in contact with the third side face 181c via the dichroic coating layer 185 and in parallel with the third side face 181c. The fifth side face 182b is opposing the optical modulator element 152 and in parallel with the second side face 181b. The sixth side face 182c is provided on an opposite side of the optical modulator element 151 with respect to the optical axis 180q of the optical modulator element 152. The sixth side face 182c is formed to be inclined at an angle larger than 0 degrees and smaller than 90 degrees with respect to the reference surface 180p passing through the intersection line 181d of a plane including the second side face 181b and a plane including the third side face 181c, the reference surface 180p being perpendicular to the plane including the second side face 181b, such that a light beam incident from the optical modulator element 151 to the prism element 181 via the first side face 181a, then reflected by the second side face 181b, and then incident from the prism element 181 to the prism element 182 via the third side face 181c and the fourth side face 182a is not totally reflected by the sixth side face 182c.

Thus, the unnecessary transmitted light and unnecessary reflected light of the dichroic coating layer 185 that have reached the side face 182c can exit from the side face 182c, without being totally reflected by the side face 182c. Therefore, it is possible to improve reduction in video contrast and temperature rise of the DMD 152 due to stray light.

According to the embodiment, the angle θx of the sixth side face 182*c* with respect to the reference surface may satisfy the mathematical expression (1).

Thus, it is possible to surely avoid total reflection on the side face 182*c* inside the prism element 182.

According to the embodiment, the dichroic coating layer may have characteristics such that a light beam incident from the optical modulator element 151 to the prism element 181 via the first aide face 181*a*, and then reflected by the second side face 181*b* is further reflected by the dichroic coating layer toward the second side face 181*b*; and a light beam incident from the optical modulator element 152 to the prism element 182 via the fifth side face 182*b* is transmitted from the prism element 182 to the prism element 181 via the dichroic coating layer.

Thus, the prism device can sufficiently serve as a prism device for use in a two-plate video projector apparatus.

According to the embodiment, there is provided the video projector apparatus is provided with the prism device 180, and the optical modulator elements 151 and 152.

According to the embodiment, the optical modulator elements 151 and 152 may be digital micromirror devices (DMDs).

In addition, even if an F value of a modulated light, and material of prism elements are arbitrarily configured, it is possible to reduce a stray light by changing an angle of the side face 182*c* with respect to the reference surface 180*p*. Therefore, it is possible to improve the degree of freedom for an entire design of the video projector apparatus 1, and in a case of reducing size and cost of the video projector apparatus 1, it is possible to avoid an increased number of optical components or a complicated control mechanism.

In the example of FIG. 1, the TIR prism 230 and the prism device 180 are arranged substantially in parallel with each other, so that incident light from the TIR prism 230 to the prism device 180 is included in the XZ plane. On the other hand, for example, the TIR prism 230 may be arranged at another angle with respect to the prism device 180. By arranging the TIR prism 230 to be inclined with respect to the prism device 180, it is possible to design the prism device 180 so as to be suitable for a direction of a light beam incident to or reflected by the DMD. It is possible to improve the degree of freedom for designing the prism device 180 with reduced size and weight, etc.

In addition, according to the embodiment, the triangular and quadrangular prism elements are configured. On the other hand, for example, two parallel edges of top and bottom faces may be chamfered if not required by design. This reduces a volume of the prism device, and thus, it is possible to improve the degree of freedom for designing a video projector apparatus with reduced size and weight, etc.

In addition, according to the embodiment, the side face 182*c* is transparent. On the other hand, the prism device may be processed so as not to be transparent in an area(s) where a light beam does not reach, for example, using sandblast treatment or black coating. Thus, it is possible to reduce other stray lights due to factors other than that of the present disclosure, and improve video contrast.

As described above, the embodiment has been described as examples of the technique of the present disclosure. To that end, the accompanying drawings and the detailed description are provided.

Accordingly, the constituent elements described in the accompanying drawings and the detailed description may include not only constituent elements essential to solving the problem, but also constituent elements not essential to solving the problem, in order to exemplify the technique. Therefore, even when those non-essential constituent elements are described in the accompanying drawings and the detailed description, those non-essential constituent elements should not be considered essentials.

In addition, since the above-described embodiment is intended to exemplify the technique of the present disclosure, it is possible to make various changes, replacements, additions, omissions, etc. within the scope of claims or the equivalent thereof.

The present disclosure can achieve a video projector apparatus capable of reducing a stray light and temperature rise due to a difference between incident angles of an illuminating light and a modulated light to a dichroic coating layer of a prism device, without increasing the number of optical components nor complicating a control mechanism in the video projector apparatus.

The invention claimed is:

1. A prism device for use in a video projector apparatus comprising first and second optical modulator elements,
   wherein the prism device comprises first and second prism elements;
   wherein the first prism element has first to third side faces in parallel with a reference axis, the first side face is opposing the first optical modulator element, and any two planes among three planes respectively including the first to third side faces intersect with each other;
   wherein the second prism element has fourth to sixth side faces in parallel with the reference axis, the fourth side face is provided to be in contact with the third side face via a dichroic coating layer and in parallel with the third side face, the fifth side face is opposing the second optical modulator element and in parallel with the second side face, the sixth side face is provided on an opposite side of the first optical modulator element with respect to an optical axis of the second optical modulator element;
   wherein the sixth side face is formed to be inclined at an angle larger than 0 degrees and smaller than 90 degrees with respect to a reference surface passing through an intersection line of a plane including the second side face and a plane including the third side face, the reference surface being perpendicular to the plane including the second side face, such that a light beam incident from the first optical modulator element to the first prism element via the first side face, then reflected by the second side face, and then incident from the first prism element to the second prism element via the third and fourth side faces is not totally reflected by the sixth side face.

2. The prism device as claimed in 1,
   wherein an angle θx of the sixth side face with respect to the reference surface satisfies:

$$\theta x > 90 - 2\cdot\theta p + \sin^{-1}\left(\frac{1}{2\cdot np \cdot F}\right) - \sin^{-1}\left(\frac{1}{np}\right),$$

wherein "F" denotes an F value of a modulated light incident from the first optical modulator element to the first prism element, "np" denotes a refractive index of the first and second prism elements, and "θp" denotes an angle between the second and third side faces.

3. The prism device as claimed in claim 1,
wherein the dichroic coating layer has characteristics such that:
a light beam incident from the first optical modulator element to the first prism element via the first side face, and then reflected by the second side face is further reflected by the dichroic coating layer toward the second side face; and
a light beam incident from the second optical modulator element to the second prism element via the fifth side face is transmitted from the second prism element to the first prism element via the dichroic coating layer.

4. A video projector apparatus comprising: a prism device, and first and second optical modulator elements,
wherein the prism device comprises first and second prism elements;
wherein the first prism element has first to third side faces in parallel with a reference axis, the first side face is opposing the first optical modulator element, and any two planes among three planes respectively including the first to third side faces intersect with each other;
wherein the second prism element has fourth to sixth side faces in parallel with the reference axis, the fourth side face is provided to be in contact with the third side face via a dichroic coating layer and in parallel with the third side face, the fifth side face is opposing the second optical modulator element and in parallel with the second side face, the sixth side face is provided on an opposite side of the first optical modulator element with respect to an optical axis of the second optical modulator element;
wherein the sixth side face is formed to be inclined at an angle larger than 0 degrees and smaller than 90 degrees with respect to a reference surface passing through an intersection line of a plane including the second side face and a plane including the third side face, the reference surface being perpendicular to the plane including the second side face, such that a light beam incident from the first optical modulator element to the first prism element via the first side face, then reflected by the second side face, and then incident from the first prism element to the second prism element via the third and fourth side faces is not totally reflected by the sixth side face.

5. The video projector apparatus as claimed in claim 4,
wherein the first and second optical modulator elements are digital micromirror devices (DMD).

* * * * *